United States Patent Office 2,959,500
Patented Nov. 8, 1960

2,959,500

PROCESS FOR THE SACCHARIFICATION OF CELLULOSE AND CELLULOSIC MATERIALS

Paul Schlapfer, Zurich, and Henri Casimir Silberman, Chur, Switzerland, assignors to Schweizerische Eidgenossenschaft, Bern, Switzerland No Drawing. Filed Feb. 14, 1956, Ser. No. 565,312

2 Claims. (Cl. 127—37)

The present invention relates to the production of sugars which are not mainly made for alimentary purposes and which are prepared by degradation of cellulosic material containing hexosanes and pentosanes, the conversion being done with hydrogen ions as catalytic agents.

In the known processes of hydrolysis of cellulosic material containing hexosanes and pentosanes, more particularly hydrolysis of wood, at temperatures of about 120–220° C. and increased pressures, aqueous acidified liquids are used, which are periodically passed through the material while it is subjected to heat and pressure, and which remove the sugar formed in the reaction chamber, so as to prevent it from decomposition.

The acid hydrolysis liquid consists of aqueous sulfuric acid of about 1%. This process yields a sugar wort with a total sugar content of about 4%. The acid wort has to be neutralized, which is conventionally done with calcium carbonate.

It is a characteristic of this process that only diluted sugar solutions are obtained, a fact that is inconvenient for their further processing. Another inconvenience of the known process consists in the clogging of the pipe system by resin formation which considerably hampers the maintenance of the plant. Moreover, lignin, which is formed in the known percolating processes, precipitates as an inert residue insoluble in water and organic solvents.

Another known process for obtaining sugar solutions from cellulosic material comprises subjecting wood in a diffusion battery in counter current with highly concentrated, i.e. about 40% hydrochloric acid solution at room temperature. According to literature accounts, about 320 liters of alcohol are obtained from 1,000 kg. wood (dry substance). In spite of this very good yield, this process has some drawbacks, since a large amount of hydrochloric acid is lost and has to be continually replaced; another difficulty is the choice of material to be used for the equipment in view of corrosion.

It has now been discovered that cellulosic material can be converted into sugar in an advantageous manner when the conversion is not performed in acidified entirely aqueous environment, but in alcoholic solution; the alcohol concentration may practically reach 100%; furthermore, part of the alcohol can be replaced by other organic non-polar solvents. Sugar formation occurs at temperatures ranging from 120 to about 200° C. and the acid concentration is from 0.001 to 0.05 normal. In carrying out the process on a technical scale, it is sometimes desirable to disregard the water content of the cellulose material to be used.

The alcoholysis of cellulose and cellulose derivatives in the presence of sulfuric acid at comparatively low temperatures (0°–100° C.) and at higher acid concentrations for the purposes of determination of structure and of degradation velocity, are known from the literature. Known are also extractions of lignin from wood with alcoholic liquids, at which time polysaccharide compounds will also partially be dissolved.

The saccharification of wood, when carried out with alcohols in the presence of acids, and the degradation of the sugar forming in the reaction, occur substantially in the same manner as if carried out with acidified water. Depending on the ratio of alcohol:water, the sugars which are formed, i.e. hexoses and pentoses, are present, partly as glycosides which can be easily split into sugar and alcohol, partly as free sugars. Part of the organic acids originating from the decomposition products of sugar, are esterified with the alcohol present.

The main difference between the saccharification of wood with aqueous acid and that carried out with aqueous acidified alcohol, lies in the fact that simultaneously with the saccharification of hemicellulose and of cellulose, a dissolving of lignin occurs, which therefore will not form a high-polymer and inert residue in the reaction chamber—as in the case of the known processes effected with aqueous acid—but which can be isolated in major quantity as a very reactive product from the aqueous-alcoholic solution. The isolation of the lignin may be effected in different ways. When it is done with alcohol boiling below 100° C., the alcoholic portion can be distilled off in any desired manner, e.g. by evacuation or evaporation in thin layers, the lignin being then precipitated from the aqueous distillation residue. The lignin may also be precipitated from the aqueous alcoholic solution by addition of water. In both cases it may be afterwards separated from the sugar solution by centrifuging or filtering.

When in the conversion of wood to sugar, in a further embodiment of the present invention, anhydrous alcohol is used in the presence of an acid catalyst, the splitting enhanced by hydrogen ion catalysts has special characteristics. As alcohols we may use aliphatic primary, aliphatic secondary, aliphatic polyhydric, aromatic, or hydro-aromatic alcohols. As acid catalysts, strong acids may be used in general, which will not form, or only slightly form, neutral esters at the conditions used; such acids are e.g.: sulfuric acid, p-toluene-sulfonic acid, per-chloric acid. The sulfuric acid will not form the neutral ester with alcohol under the then prevailing conditions of reaction; even when a very large excess of alcohol is used for the alcoholysis of wood, it will only form acid alkylsulfuric acid which will not adversely affect the catalytic action of sulfuric acid, as contrasted to the neutral ester.

As compared to the hydrolysis of wood with aqueous acid, the reaction velocity of the saccharification with acidulated anhydrous alcohol, is increased to a multiple of the former. Consequently, when it is desired to reach the same velocity as in aqueous environment, the quantity of acid or the reaction temperature may be decreased. Thus, alcoholysis can be effected with a sulfuric acid concentration of only 0.02% to 0.1%, whereas aqueous saccharification requires a six to thirtyfold higher sulfuric acid concentration.

In the anhydrous alcoholysis carried out with cellulosic material, the sugars will be obtained in the form of their glycosides. The decomposition products of the sugars (organic acids), are esterified with the alcohol used. The esterification of the organic acids formed during the reaction, makes it possible to saccharify at very low, constant, and accurately adjustable acid concentrations.

Lignin too will not be obtained as such, but as a compound with alcohol, which can, however, be easily split into the components lignin and alcohol. This can e.g. be done by boiling the lignin-alcohol compound with strongly diluted alcaline solutions, whereby a quantitative splitting of the lignin-alcohol compound into its components can be accomplished.

Where, in the saccharification of wood with alcohol, part of the alcohol is replaced by organic inert non-polar solvents, such as xylene, ligroin, isopropyl ether, the reaction will occur in the same manner as if a higher alcohol were used. Consequently, instead of an expensive higher alcohol, a lower, cheaper homologue may be used, which has the added economical advantage that it permits easier recovery.

If the non-polar solvent is used in too large an amount, the course of the reaction will be affected adversely: in general it may be stated, however, that of an inert solvent a larger amount can be added to a lower alcohol than to a higher one. The mixture of propanol-xylene in the ratio of about 1:1 is a very good one. Since the evaporation heat of such a mixture is about one quarter of that of water, the heat economy of this solvent as compared to water is obvious, particularly in cases when a complete evaporation or a strong concentration of the solution should occur, as in the preparation of glucose.

Tests have further shown that the saccharification velocity in the presence of alcohol depends on the quantity of liquid used for the hydrolysis, i.e. on the ratio dry wood substance:liquid. In the presence of large quantities of liquid, saccharification will occur faster than with small quantities of liquid, other conditions being identical. It has e.g. been established that in the alcoholysis with propanol-xylene 1:1 at 180° C. with a sulfuric acid concentration of 1/40 normal and the reaction time of 40 minutes, of the originally present cellulose, the following amounts were saccharified:

|  | Percent |
|---|---|
| At a ratio of dry wood substance to liquid 1:5 | 40 |
| At a ratio of dry wood substance to liquid 1:8 | 75 |
| At a ratio of dry wood substance to liquid 1:10 | 85 |
| At a ratio of dry wood substance to liquid 1:20 | 92 |

Tests have further shown that the saccharification velocity in the presence of alcohol depends on the kind of the cellulosic material, e.g. elm wood, filter paper or linen, pine wood, and beech wood are saccharified with increasing velocity in the order indicated above.

The decomposition of the sugars formed in the reaction occurs in the saccharification of wood by means of acidified anhydrous alcohols or alcohols in mixture with inert solvents, in the same manner as in aqueous acid hydrolysis. In both cases, principally a dehydration of sugar catalytically promoted by hydrogen ions takes place.

The advantages of the saccharification process of wood with anhydrous alcohols in the presence of organic non-polar solvents, such as xylene, consists in the better reaction velocity and in the improved ratio of sugars formed:sugars decomposed, as compared to the hydrolysis in the acidified aqueous liquids. At the same time sugar solutions of higher concentrations are obtained. If desired, the alcoholysis of wood, be it with alcohol alone or with a mixture of alcohol and an inert solvent, may be preceded by an aqueous-alcoholic stage, in which the hemicelluloses and part of the lignin are dissolved.

The sugar solutions obtained in aqueous alcohol environments which contain the sugar, as stated above, partly in form of glycosides, and the lignin partly in form of an alcoholic compound, can be easily processed. This can e.g. be done by removing the organic solvents from the sugar solutions by distillation. In this operation it is not necessary to neutralize the acid sugar solution. Lignin is precipitated directly from the distillation residue as the alcohol content decreases in the course of the concentration, i.e. during the evaporation of the acid organic sugar solution. In order to make the lignin precipitate in a form suitable for its isolation, certain measures have to be observed in the evaporation of the worts. Among other things, it is necessary to operate with reduced pressure which will result in a lower evaporation temperature; it is desirable that the temperature should not exceed 60° C. and should be so controlled that the evaporation temperature drops as the alcohol content of the extract decreases. When operating under such conditions, a reactive lignin, easy to isolate, is obtained as distillation residue together with a concentrated sugar solution. If the reactivity of the lignin is of no importance, the operation can be carried out at higher temperatures.

When the alcoholysis is carried out in the presence of anhydrous alcohol or in mixtures of alcohol and inert solvent, evaporation can likewise be carried out to dryness without previous neutralization of the acid. In a subsequent dispersion of the residue in a small amount of water, the glycoside is dissolved and the lignin remains undissolved.

We have found it to be advantageous when carrying out saccharification in the presence of alcohol to work in an environment with the exclusion of metal ions. Comparison tests carried out with addition of metal salts and without the presence of metal salts show that the saccharification velocity is either accelerated or delayed, depending on the nature of the metal ion. In all cases, however, the ratio of the sugar formed and decomposed, is adversely affected by the presence of metal ions. Furthermore, the presence of metal salts counteracts the dissolving of the lignin. It should also be avoided that metal ions are given off by the walls of the reaction vessels or, if not entirely avoidable, the amount of ions released should be minimized, since in the saccharification effected in such apparatus, part of the acid will be converted into metal salts; this will on the one hand decrease the hydrogen ion concentration catalytically active, on the other hand lead to disturbances of the reaction by the presence of metal salts.

The invention will now be more fully described in a number of examples, but it should be understood that these are given by way of illustration and not of limitation, and that many changes in the details can be made without departing from the spirit of the invention.

EXAMPLE 1

0.8 gram pine wood flour is mixed with 8 times the amount of n-propanol-water mixture, calculated on the dry wood substance, and heated in a sealed glass tube at constant temperature. The amount by volume of propanol-water, acid concentration, temperature and time of reaction are given in Table I below. After the reaction is terminated the glass tube is opened, the remaining wood sucked off, rinsed and dried, whereupon the non-saccharified cellulose is converted into glucose by treatment with sulfuric acid of 72% according to the method of Saeman, Bubl and Harris (Ind. Eng. Chem. Anal. Ed. 17, page 35, 1945). The amount of glucose is determined according to Schaffer and Somogyi (J. Biolog. Chem. 100, page 695, 1933). In the filtrate, the reducing substances are determined before and after inversion (with 4% sulfuric acid, heated to boiling temperature for 4½ hours). In the inverted solution the reducing susbtances are further determined after fermentation. By means of the figures of the analyses, the values for glucose, glucoside and non-fermentable reducing substances are computed. The contents in glucose in the reaction residue, expressed in percent of the weighed-in dry substance, determines the "potential sugar" in the residual wood. In the filtrates, glucosides were determined by splitting with selectively acting enzymes (alpha and beta-glucosidase). The ratio glucose:glucoside in the filtrate was found as follows: in propanol-water (1:1), they were 2/1 to 4/1, depending on acid concentration and duration of test; in n-propanol-water (2:1), they were about 1/1. The non-fermentable reducing substances in the filtrates amount to about 0.3–9%, mostly 1–2%, calculated on the original dry-wood substance, and they are not particularly mentioned in Table I.

Table I

[Aqueous alcoholic wood saccharified at 180° C. Potential sugar in the starting material 86%. Reducing substances in the wort determined after inversion. Concentration of acid (hydrochloride acid) indicated in normality]

|  | Acid Conc., N | Duration of Test, Min. | Pot. Sugar in residual wood, Percent | Red. Substances in the filtrate, Percent |
|---|---|---|---|---|
| n-propanol-water (1:1) | 0.05 | 5 | 40.5 | 25.6 |
|  | 0.05 | 40 | 24.0 | 25.5 |
|  | 0.05 | 80 | 17.0 | 22.5 |
|  | 0.10 | 15 | 27.0 | 23.5 |
|  | 0.10 | 40 | 13.0 | 22.0 |
|  | 0.15 | 15 | 21.5 | 24.3 |
|  | 0.15 | 40 | 6.7 | 18.2 |
| n-propanol-water (2:1) | 0.03 | 10 | 40.0 | 23.0 |
|  | 0.03 | 40 | 35.3 | 24.8 |
|  | 0.07 | 10 | 34.0 | 24.5 |
|  | 0.07 | 40 | 26.0 | 25.5 |
|  | 0.13 | 40 | 14.0 | 23.3 |

EXAMPLE 2

In a sealed glass tube, 0.5 gram air-dry pine wood flour is weighed, and 20 ccm. n-propanol and acidified water (1:1) are added and heated for 1 hour at 170° C. After the reaction is terminated, the residual wood is sucked off, washed, dried, and weighed. Lignin is isolated with 72% sulfuric acid from the residual wood and determined gravimetrically. The used wood flour had the following composition:

|  | Percent |
|---|---|
| Cellulose | 45.1 |
| Hemicellulose | 14.6 |
| Lignin | 26.3 |
| Moisture | 10.5 |
| Resins, salt, fats, etc. | 3.5 |

In Table II, below, the results of tests using different acid concentration are listed. The hemicelluloses are completely dissolved. Lignin and cellulose are given as percent of the residual wood, the weighed-in amount being under atmospheric moisture conditions.

Table II

| Acid concentration, N | Lignin, Percent | Cellulose, Percent |
|---|---|---|
| 0.0125 | 3.5 | 35.3 |
| 0.0250 | 2.4 | 31.2 |
| 0.050 | 1.3 | 26.9 |
| 0.20 | 1.8 | 2.6 |

EXAMPLE 3

The procedure is the same as in Example 2, but the saccharification liquid is ethanol-water (1:1), the duration one hour, the temperature 140° C.

Table III

| Acid concentration, N | Lignin, Percent | Hemi-cellulose, Percent | Cellulose, Percent |
|---|---|---|---|
| 0.0125 | 20.0 | 7.0 | 45.0 |
| 0.0250 | 14.1 | 1.7 | 44.1 |
| 0.050 | 9.2 | 0 | 42.3 |

EXAMPLE 4

Lignin is prepared from the solutions made according to Example 3 by addition of water which yields a flocculant precipitate that is filtered, washed and dried in vacuo at 60° C. The dry lignin is a light brown powder, having a methoxy number between 15 and 17.

When the sugar solutions are evaporated to 1/5 of the original volume under reduced pressure at temperatures between 20 and 60° C., an aqueous-alcoholic distillate and a residue are obtained, the latter consisting of a precipitated lignin in aqueous, acid sugar solution. After filtering, washing, and drying in vacuo, the so obtained lignin likewise has a methoxy number between 15–17.

The methoxy number of the original lignin in wood is 15.7. When lignin is prepared by the aqueous hydrolysis in acid environment at high temperature, it will exhibit, after isolation from residual cellulose, a methoxy number of only 11.7.

The lignin obtained by precipitation or evaporation is soluble in aqueous alcali and in organic solvents. When heated in a drying oven, such lignins will have the following characteristics:

Table IV

| Temperature, ° C. | Period in drying oven, hrs. | Loss of weight, percent | Methoxyl content, percent |
|---|---|---|---|
| 65 | 60 | 10 | 17 |
| 110 | 40 | 15 | 17 |
| 180 | 100 | 18 | 16 |
| 250 | 60 | 40 | 5 |

EXAMPLE 5

Alcoholysis is carried out of pine wood flour in the manner described in Example 1, however with anhydrous primary aliphatic alcohols as saccharification liquid; the results are tabulated below:

Table V

| Alcohol | $H_2SO_4$, N | Ratio, Wood: Liq. | Temp., ° C. | Dur. of Test, Min. | Pot. Sugar, Percent | Red. Subst. in filtrate, Percent |
|---|---|---|---|---|---|---|
| n-propyl alc. | 0.03 | 1/8 | 180 | 80 | 22.6 | 33.8 |
| n-amyl alc. | 0.025 | 1/8 | 180 | 10 | 39.4 | 18.2 |
|  | 0.025 | 1/8 | 180 | 20 | 34.3 | 21.3 |
|  | 0.025 | 1/8 | 180 | 40 | 25.7 | 21.5 |
| n-octyl alc. | 0.025 | 1/8 | 180 | 5 | 39.3 | 16.3 |
|  | 0.025 | 1/8 | 180 | 10 | 33.4 | 17.8 |
|  | 0.025 | 1/40 | 180 | 10 | 29.9 | 21.2 |

EXAMPLE 6

In the alcoholysis of pine wood flour carried out as in Example 5 other anhydrous alcohols were used as saccharification liquids; the results obtained are tabulated below.

Table VI

| Alcohol | $H_2SO_4$, N | Ratio, Wood: Liq. | Temp., ° C. | Dur. of Test, Min. | Pot. Sugar, Percent | Red. Subst. in filtrate, Percent |
|---|---|---|---|---|---|---|
| Ethyleneglycol | 0.050 | 1/20 | 180 | 30 | 25.7 | 24.5 |
| Cyclohexanol | 0.025 | 1/8 | 180 | 60 | 45.7 | 12.2 |
|  | 0.025 | 1/40 | 180 | 60 | 32.5 | 20.6 |
| Ethylcellosolve | 0.025 | 1/8 | 180 | 30 | 24.2 | 22.5 |
|  | 0.025 | 1/20 | 180 | 30 | 14.4 | 34.2 |

EXAMPLE 7

A number of tests was carried out to permit a comparison between the acid contents of the saccharification liquid before heating, with that of the saccharification liquid used and heated by itself to 180° C., and with that of sugar solution after completed saccharification. These tests give information on the esterification of the catalytically active acid and on the esterification of the organic acid formed during the reaction. The results of these tests are tabulated below. The values given were obtained by titration with 0.1 normal NaOH to pH 9, and they refer to tests in all of which one half of the wood originally present was saccharified.

Table VII

| Liquid, Acid, Acid concentr., N | Liquid heated without wood, Acid concentr., N | Test conditions Temp., °C. | Test conditions Dur., Min. | Liquid heated with wood, Acid concentr., N |
|---|---|---|---|---|
| HCl, 0.03 aqueous | 0.03 | 180 | 80 | 0.16 |
| HCl, 0.05 n-propanol-water (1:1) | 0.04 | 180 | 40 | 0.09 |
| $H_2SO_4$, 0.025 n-amyl alcohol | 0.0125 | 180 | 40 | 0.0125 |

EXAMPLE 8

Alcoholysis of pine wood flour was carried out similarly to Example 1 but with mixtures of anhydrous alcohols with inert solvents, and the values given below in Table VIII were obtained.

Table VIII

| Solvent | $H_2SO_4$, N | Ratio, Wood/Liquid | Temp., °C. | Dur. of Test, Min. | Pot. Sugar, Percent | Red. Subst. in filtrate, Percent |
|---|---|---|---|---|---|---|
| Xylene-n-Propanol (1:1) | 0.025 | 1/5 | 180 | 10 | 41.5 | 12.8 |
| | 0.025 | 1/8 | 180 | 10 | 33.3 | 20.4 |
| | 0.025 | 1/10 | 180 | 10 | 31.1 | 21.8 |
| | 0.025 | 1/20 | 180 | 10 | 32.4 | 22.9 |
| | 0.025 | 1/40 | 180 | 10 | 31.7 | 27.9 |
| | 0.025 | 1/5 | 180 | 20 | 31.6 | 18.0 |
| | 0.025 | 1/8 | 180 | 20 | 25.4 | 24.7 |
| | 0.025 | 1/10 | 180 | 20 | 19.9 | 25.8 |
| | 0.025 | 1/20 | 180 | 20 | 15.7 | 31.0 |
| | 0.025 | 1/5 | 180 | 40 | 30.8 | 17.5 |
| | 0.025 | 1/8 | 180 | 40 | 12.0 | 24.6 |
| | 0.025 | 1/10 | 180 | 40 | 6.9 | 30.1 |
| | 0.025 | 1/20 | 180 | 40 | 4.2 | 32.5 |
| | 0.040 | 1/8 | 180 | 15 | 11.6 | 35.4 |
| | 0.0125 | 1/40 | 180 | 80 | 12.7 | 36.3 |
| | 0.007 | 1/40 | 180 | 120 | 19.3 | 35.0 |
| Xylene-n-propanol (1:2) | 0.007 | 1/40 | 180 | 80 | 34.1 | 27.5 |
| Xylene-n-propanol (2:1) | 0.0075 | 1/40 | 180 | 80 | 21.2 | 31.5 |
| Xylene-ethanol (2:1) | 0.02 | 1/5 | 200 | 7 | 30.7 | 12.0 |
| | 0.02 | 1/8 | 200 | 7 | 29.3 | 19.3 |
| | 0.02 | 1/8 | 200 | 15 | 0.7 | 12.1 |
| | 0.01 | 1/8 | 200 | 15 | 43.3 | 10.5 |
| Isopropyl-ether-n-propanol (1:1) | 0.04 | 1/8 | 180 | 8 | 31.9 | 24.2 |
| | 0.04 | 1/8 | 180 | 25 | 5.6 | 31.4 |
| Isopropyl-ether-isopropanol (1:1) | 0.04 | 1/8 | 180 | 8 | 28.2 | 17.5 |
| | 0.04 | 1/8 | 180 | 15 | 14.0 | 21.6 |

When the test results were compared with those of J. F. Saeman (Ind. Eng. Chem. 37, page 43, 1945), which were obtained in a similar manner but by working with aqueous sulfuric acid, a comparison can be made between alcoholysis and hydrolysis of wood.

EXAMPLE 9

Alcoholysis was carried out with filter paper (Whatman No. 1), linen, elmwood and beechwood, in the manner described in Example 1. Table IX below shows the results:

TABLE IX

| Subst. | Solvent | $H_2SO_4$, N | Ratio, Subst.: liquid | Temp., °C. | Dur. of test, Min. | Pot. sugar, percent | Red. Subst. in filtrate, percent |
|---|---|---|---|---|---|---|---|
| Filter-paper | Xylene-n-propanol (1:1) | 0.0125 | 1/16 | 180 | 20 | 69.8 | 23.9 |
| | | 0.0125 | 1/16 | 180 | 80 | 37.5 | 40.7 |
| | | 0.0125 | 1/16 | 180 | 160 | 5.7 | 34.9 |
| Linen | Xylene-n-propanol (1:1) | 0.007 | 1/16 | 180 | 120 | 45.9 | 38.1 |
| Elm | Xylene-n-propanol (1:1) (2:1) | 0.007 | 1/40 | 180 | 30 | 41.2 | 7.7 |
| | | 0.007 | 1/40 | 180 | 80 | 44.1 | 11.7 |
| Beech | Xylene-n-propanol (2:1) (1:1) | 0.007 | 1/40 | 180 | 80 | 14.7 | 36.9 |
| | | 0.007 | 1/40 | 180 | 120 | 13.7 | 40.8 |

EXAMPLE 10

Pine wood flour was subjected to an aqueous-alcoholic partial saccharification with N/40 sulfuric acid and ethanol water (1:1) for 3 hours at 140° C. The residual wood was filtered, washed and dried. By analysis it was found that in the partial saccharification, resins, salts, fats and hemicelluloses were practically dissolved from the wood. Only a few percent of the original cellulose were dissolved, of lignin about ⅓ passed into the solution. In the subsequent anhydrous saccharification of a thus pre-saccharified wood, this wood exhibits the same properties as regards saccharification velocity and sugar output as does untreated wood. This can be seen from Table X. The values for potential sugar and for reducing substances in the wort of the pre-saccharified wood relate to the weighed-in substance (dry substance) of pre-saccharified wood consisting of 71.2 cellulose, 28.0% lignin.

Table X

[Saccharification of untreated wood and of pre-saccharified wood with 0.04 N sulfuric acid in xylene-n-propanol (1:1) at 180° C.]

| Wood | Ratio, Wood: Liquid | Duration of test, Min. | Pot. Sugar, Percent | Red. Subst. in filtrate, Percent |
|---|---|---|---|---|
| Untreated | 1/8 | 3 | 39.6 | 21.0 |
| Do | 1/8 | 7 | 27.3 | 27.8 |
| Pre-saccharified | 1/12 | 7 | 41.9 | 16.1 |
| Untreated | 1/8 | 15 | 11.6 | 35.4 |
| Do | 1/8 | 30 | 3.3 | 34.3 |
| Pre-saccharified | 1/8 | 30 | 4.2 | 32.4 |
| Do | 1/12 | 30 | 8.1 | 36.3 |

EXAMPLE 11

The saccharification of pine wood was carried out in sealed glass tubes, in the presence and in the absence of metal salts with otherwise identical test conditions, results being then compared:

Wood weighed-in_____ 0.5 gr.
Ratio wood:liquid_____ 1/40.
Solvent_____ n-Propanol-water (1:1).
Temperature _____ 170° C.
Duration of test_____ 2 hours.
Sulfuric acid concentration___ N/40.

The tests gave the following results:

Without salt addition:
   Cellulose in the residual wood_____ 35%.
   Isolated liquid in the residual wood _____ 1.5% (light brown).

With addition of 0.5 gr. iron ammonium sulfate, $FeSO_4(NH_4)_2SO_4-6H_2O$:
   Cellulose in the residual wood _____ 41%.
   Isolated lignin in the res. wood _____ 2.5% (dark resinous).

EXAMPLE 12

The saccharification of pine wood flour was carried out in a vessel of steel (18 Cr, 8 Ni, 2.5 Mo, balance Fe). The test conditions were as follows:

Ratio wood:liquid _____ 1/40.
Solvent_____ n-Propanol-water (1:2).
Temperature_____ 180° C.
Duration of test _____ 2 hours.
Sulfuric acid concentr_____ N/40.

The residual wood had the following composition:

| | Percent |
|---|---|
| Potential sugar | 49.0 |
| Lignin | 16.5 |

The filtrate contained metal ions.

What we claim is:

1. A process for the saccharification of cellulose and cellulosic materials containing hexosanes and pentosanes, which comprises heating said materials at 120–200° C. with an alcohol, selected from the group consisting of isopropanol, n-propanol, n-amyl alcohol, n-octanol, ethylene glycol, cyclohexanol and ethyl cellosolve, and mixtures thereof with a diluent, selected from the group consisting of water, xylene and isopropyl ether, said liquids further containing an acid in a concentration of 0.025 to 0.2 normality and selected from the group consisting of sulfuric acid, chlorosulfonic acid and perchloric acid; said liquids being applied in quantities 5 to 40 times the dry weight of said cellulose and cellulosic materials; precipitating the lignin present in said materials by addition of water; removing the precipitate; and recovering the saccharification products, which are sugars and sugar glucosides, by concentration and crystallization.

2. The process according to claim 1, wherein said cellulose and cellulosic materials, prior to heating with said acid alcohols, are subjected to a pretreatment which consists of heating said materials at 120–200° C. with an aqueous alcohol for the removal of hemicellulose, resins, and of part of the lignin present.

References Cited in the file of this patent

UNITED STATES PATENTS

| | | |
|---|---|---|
| 1,863,654 | Farber | June 21, 1932 |
| 1,917,539 | Miles | July 11, 1933 |
| 2,166,540 | Bailey | July 18, 1939 |
| 2,374,676 | Gardner | May 1, 1945 |
| 2,390,507 | Canter | Dec. 11, 1945 |
| 2,465,347 | Boehm | Mar. 29, 1949 |
| 2,526,607 | Kurth | Oct. 17, 1950 |
| 2,538,457 | Hudson | Jan. 16, 1951 |

OTHER REFERENCES

The Chemistry of Lignin by Brauns, Academic Press, Inc., N.Y., 1952, pp. 65–74.

Chemistry of Wood by Hogglund, Academic Press, Inc., N.Y., p. 237.